United States Patent [19]
Bardl et al.

[11] Patent Number: 5,442,695
[45] Date of Patent: Aug. 15, 1995

[54] RINGER CIRCUIT

[75] Inventors: Artur Bardl; Emil Navratil, both of Munich, Germany

[73] Assignee: Siemens Aktiengesellschaft, Munich, Germany

[21] Appl. No.: 364,415

[22] Filed: Dec. 27, 1994

Related U.S. Application Data

[63] Continuation of Ser. No. 49,671, Apr. 16, 1993, abandoned.

[30] Foreign Application Priority Data

Apr. 16, 1992 [DE] Germany ................... 42 12 858.7

[51] Int. Cl.6 .................................. H04M 1/26
[52] U.S. Cl. .................................. 379/375; 379/373; 379/377
[58] Field of Search ................... 379/375, 373, 377

[56] References Cited

U.S. PATENT DOCUMENTS

| | | | |
|---|---|---|---|
| 4,107,476 | 8/1978 | Henderson | 379/373 |
| 4,140,884 | 2/1979 | Duimet et al. | 379/373 |
| 4,163,873 | 8/1979 | Phelps | 379/375 |
| 4,315,109 | 2/1982 | Jacobson | 379/375 |
| 4,346,265 | 8/1982 | Buss et al. | 379/373 |
| 4,658,419 | 4/1987 | Denen | 379/375 |

FOREIGN PATENT DOCUMENTS 0137901  4/1985  European Pat. Off. .

*Primary Examiner*—James L. Dwyer
*Assistant Examiner*—Jacques M. Saint-Surin
*Attorney, Agent, or Firm*—Herbert L. Lerner; Laurence A. Greenberg

[57] ABSTRACT

A ringer circuit includes a rectifier unit receiving a calling alternating voltage and having first and second output terminals. An acoustic transducer has first and second terminals. A controllable first switch is connected between the first output terminal of the rectifier unit and the first terminal of the acoustic transducer. A controllable second switch is connected between the first and second terminals of the acoustic transducer. A capacitor is connected between the second terminal of the acoustic transducer and the second terminal of the rectifier unit. A switch control is supplied from the capacitor for opening and closing the first and second switches in alternation and in phase opposition to one another as a function of the calling alternating voltage.

12 Claims, 1 Drawing Sheet

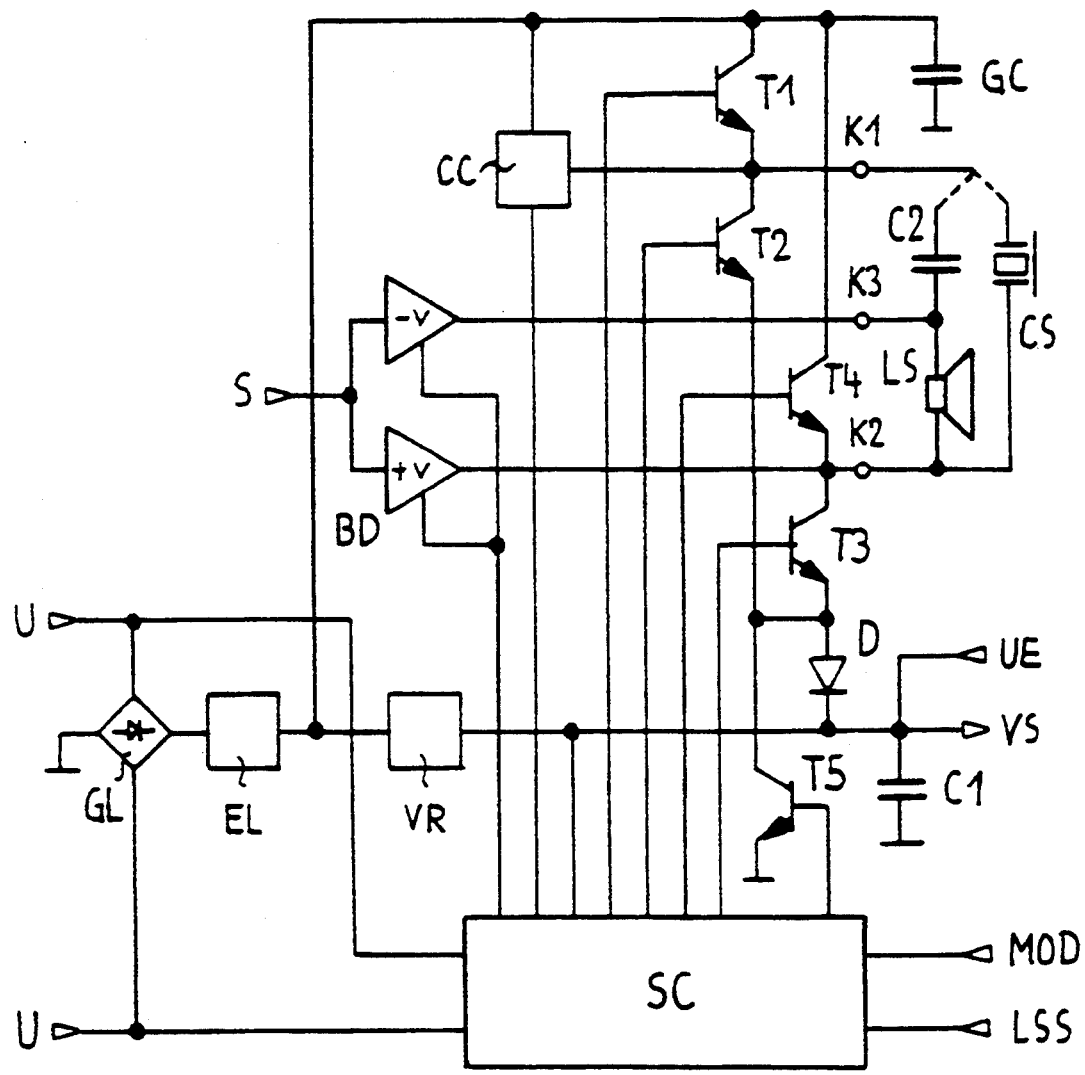

RINGER CIRCUIT

This application is a continuation of application Ser. No. 08/049,671, filed Apr. 16, 1993, now abandoned.

FIELD OF THE INVENTION

The invention relates to a ringer circuit.

In modern telephones with electronic ringing tone generation, a calling alternating voltage which is transmitted by switching centers to call a subscriber, is split into two components. One component is the information contained in it, such as the frequency and amplitude of the signal, and the other component is the transmitted electrical power, which is used to operate a device for measuring frequency and amplitude and to generate the acoustical ringer signal. The electrical power output by the switching centers must be delivered to the individual consumers with good efficiency, in order to achieve high acoustical power of the ringer signal.

BACKGROUND OF THE INVENTION

Known ringer components often control a piezoelectric crystal transducer, which because of its high impedance and good acoustical efficiency assures good line adaptation to the impedance of the calling alternating voltage generator in the switching center. However, they do not have an adequate voltage supply for a microcontroller, which would enable flexible and comprehensive functional and operational convenience in terms of ringing tone detection and tone production.

If the ringing tone transmission is carried out through a low-impedance loudspeaker, then the high-impedance output stage of the calling alternating voltage generator must be adapted to the low-impedance loudspeaker with the aid of a transformer. In the speech mode, when the loudspeaker is to be driven by the reception path, the transformer must usually be switched off and the loudspeaker coupled directly to the amplifier. Versions with two loudspeakers of different impedance are also known.

In order not to incur such additional expense, versions are described, for instance in German Published, Non-Prosecuted Application DE 41 13 113 A, that have a direct current converter, which in the ringing tone mode converts the high impedance into a lower impedance at a correspondingly reduced voltage, and thus enables the voltage supply for operating a microcontroller as well. The attainable efficiencies of the direct voltage converter are approximately 70%. However, the power furnished to the acoustic transducer may drop below satisfactory values under some circumstances.

SUMMARY OF THE INVENTION

It is accordingly an object of the invention to provide a ringer circuit, which overcomes the hereinafore-mentioned disadvantages of the heretofore-known devices of this general type and which is more efficient.

With the foregoing and other objects in view there is provided, in accordance with the invention, a ringer circuit, comprising a rectifier unit receiving a calling alternating voltage and having first and second output terminals; an acoustic transducer having first and second terminals; a controllable first switch connected between the first output terminal of the rectifier unit and the first terminal of the acoustic transducer; a controllable second switch connected between the first and second terminals of the acoustic transducer; a capacitor connected between the second terminal of the acoustic transducer and the second terminal of the rectifier unit; and a switch control being supplied from the capacitor for opening and closing the first and second switches in alternation and in phase opposition to one another as a function of the calling alternating voltage.

In accordance with another feature of the invention, there is provided a controllable third switch being connected between the second switch and the second terminal of the acoustic transducer and being opened and closed simultaneously with the first switch; and a controllable fourth switch being connected between the first output terminal of the rectifier unit and the second terminal of the acoustic transducer and being opened and closed simultaneously with the second switch.

In accordance with a further feature of the invention, the switch control receives a selection signal for keeping the third switch closed and the fourth switch open.

In accordance with an added feature of the invention, there is provided a dynamic acoustic transducer, and a further capacitor connected in series with the dynamic acoustic transducer.

In accordance with an additional feature of the invention, there is provided a potential-free end stage being controllable by a speech alternating voltage and being connected to the dynamic acoustic transducer, the end stage being put out of operation upon the appearance of the calling alternating voltage.

In accordance with yet another feature of the invention, there is provided a diode having one terminal connected to the second and third switches and another terminal connected to the capacitor; and a controllable fifth switch having one terminal connected to the second and third switches and another terminal connected to the second terminal of the rectifier unit, the fifth switch being closed by the switch control if a predetermined voltage at the capacitor is exceeded.

In accordance with yet a further feature of the invention, there is provided a voltage regulator being supplied by the rectifier unit and having an output side connected parallel to the capacitor.

In accordance with yet an added feature of the invention, there is provided a clamp circuit for limiting the voltage across the first switch if the switches are open.

In accordance with yet an additional feature of the invention, the first switch or the first and fourth switches are each operated as an emitter follower circuit and have a base at which a voltage is applied being higher than at the capacitor by a predetermined value.

In accordance with again another feature of the invention, the second switch is kept closed and the first switch is kept opened until the further capacitor is discharged.

In accordance with a concomitant feature of the invention, there is provided a power-on logic not activating the rectifier unit until a predetermined value of the calling alternating voltage U is exceeded.

Other features which are considered as characteristic for the invention are set forth in the appended claims.

Although the invention is illustrated and described herein as embodied in a ringer circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The drawing is a schematic and block circuit diagram of an exemplary embodiment of the invention.

DETAILED DESCRIPTION OF THE PREFERRED EMBODIMENTS

Referring now to the single figure of the drawing in detail, there is seen a ringer circuit of the exemplary embodiment that includes a bridge rectifier GL which is supplied with a calling alternating voltage U and which has an output to which a smoothing capacitor GC is connected through a power-on logic EL. The bridge rectifier GL and the smoothing capacitor GC form a rectifier unit, which generates a first supply direct voltage across the capacitor GC from the calling alternating voltage U, and which has first and second output terminals that are provided by the terminals of the smoothing capacitor GC. The power-on logic EL located between them is constructed in such a way that it does not couple the smoothing capacitor GC to the bridge rectifier GL until a predetermined value of the calling voltage U is exceeded. An npn transistor T1 has an emitter which is connected to a terminal K1 and a collector which is connected to an output terminal, namely in this case to the positive first output terminal of the rectifier unit. An npn transistor T2 has a collector which is also connected to the terminal K1 and an emitter which is connected to a collector of an npn transistor T5 and to an anode terminal of a diode D. A cathode terminal of the diode D is connected to a terminal of a capacitor C1. The capacitor C1 has another terminal which is connected to the other terminal, or in other words to the negative terminal, of the rectifier unit, like the emitter of the transistor T5.

According to a further feature of the invention, an emitter of an npn transistor T3 is also connected to the anode terminal of the diode D and its collector is connected to a terminal K2. The collector-to-emitter path of an npn transistor T4 is located between the positive terminal of the rectifier unit and the terminal K2. All of the transistors T1-T5 are operated primarily as controllable switches, which are controlled through their bases by a switch control SC. The switch control SC is supplied with the voltage located across the capacitor C1 and opens and closes the two transistors T1 and T2 in alternation and in phase opposition to one another. The triggering of the transistors T1 and T2 depends on the various conditions of the calling alternating voltage U, which is why the switch control SC is also acted upon by the calling alternating voltage U. Two operating modes are possible for the switch control SC and these modes can be selected by means of a suitable mode signal MOD. In a first mode, the transistor T3 is permanently conducting and the transistor T4 is permanently blocked. Conversely, in the second mode, the transistor T3 is made conducting or blocked in synchronism with the transistor T1, and the transistor T4 is made conducting or blocked synchronously with the transistor T2.

A voltage regulator VR is also connected between the rectifier unit and the capacitor C1. A clamp circuit CC which is also provided, limits the voltage across the transistor T1 whenever all of the transistors T1-T5 are blocked. The clamp circuit CC may, for instance, be controlled by the switch control SC. Finally, a potential-free end stage, in this case a bridge end stage BD, is provided. For instance, the bridge end stage BD may include two amplifiers being operated in phase opposition and being triggered by a speech signal S, with the amplifiers having respective gains of v and −v. Output terminals of the bridge end stage BD are respectively connected to the terminal K2 and to a terminal K3. A preferably dynamic acoustic transducer, such as a loudspeaker LS, is connected between the terminals K2 and K3 and is intended primarily for transmitting speech signals, for instance in speaker phones or hands-free telephone sets. For acoustical ringing tone generation, a capacitor C2 or a preferably piezoelectric transducer, namely a piezoelectric crystal transducer CS, should be selectively switched between the terminals K1 and K3, in the case of the capacitor C2, or between the terminals K1 and K2, in the case of the transducer CS. Preferably, the capacitor C2 is used in the first mode, and the piezoelectric crystal transducer CS is used in the second mode.

The first mode, in which the transistor T3 is permanently made conducting and the transistor T4 is permanently blocked, is equivalent to a circuit in which the transistor T4 is dispensed with and the transistor T3 is replaced by a direct connection. In both the first mode and the second mode, non-overlapping trigger signals for the transistors T1-T4 are preferably used, so that transistors to be triggered in phase opposition at the transition from the conducting state to the blocking state and vice versa do not simultaneously become conducting. The trigger signals for the transistors T1-T4 are generated as a function of the frequency and/or the amplitude, for example, of the calling alternating voltage U. In a first phase of the trigger signals, the transistor T1 is made conducting in the first mode. This causes the current to flow through the capacitor C2, the loudspeaker LS, the transistor T3, which is likewise made conducting, the diode D, and the capacitor C1. The voltage at the capacitor C1 rises to a value that results from the voltage division between the capacitors C1 and C2, minus the voltage drop at the loudspeaker LS and at the transistors T1 and T2. The current through the loudspeaker LS deflects the diaphragm. The voltage rise at the capacitor C1 is evaluated by the switch control SC, which makes the transistor T5 conducting if a predetermined value is exceeded. The charging current no longer required for the capacitor C1 is diverted as a result to the negative terminal of the rectifier unit. However, this further increases the charge at the capacitor C2. Once the charging process is concluded, then no further current flows through the loudspeaker LS. In the ensuing transitional phase, all of the switches of the transistors T1 and T5, or of the transistors T1, T3 and T5, are blocked.

The voltage between the emitter of the transistor T1 and the anode terminal of the diode D determines the current across the loudspeaker LS and therefore the volume of the ringing tone produced. According to a further feature of the invention, through the use of the switch control SC, this voltage is fixed at a predetermined value, for instance as a function of a volume control signal LSS and/or as a function of the amplitude of the calling alternating voltage U. This is done by operating the transistor T1 as an emitter follower, having a base which is applied to an appropriate potential.

If the switch control SC is constructed in such a way that a reference to the maximum calling alternating voltage U is established, then this assures that a variation in the volume without any idle control time is possible regardless of the operating conditions.

In the event of varying volume and a differing current consumption by the switch control SC and optionally other units VS supplied from the capacitor C1, the instant at which the transistor T5 is turned on shifts, automatically within one switching phase. The switching threshold for making the transistor T5 conducting is dimensioned in such a way that under the least favorable conditions an adequate supply current can be drawn from the capacitor C1 without the voltage regulator VR becoming active. In the event of higher current consumption or less volume, as the voltage across the capacitor Cl drops, the voltage regulator VR is automatically activated to reinforce the voltage across the capacitor C1, preferably during a transition phase in which the transistors T1–T4 are blocked. Furthermore, the transistors T1–T4 are preferably constructed as npn transistors, so that the base control current also contributes to the improvement in efficiency. In principle, however, a reversal of the control to pnp transistors is also possible. Moreover, the known ringer circuit can also be constructed in MOS or BICMOS technology. Finally, the switch functions can also be achieved with external transistors.

In the transitional phase, the emitter potential of the transistor T1 is fixed at a predetermined value, so that the circuit, floating free of potential and including the charged capacitor C2 and the loudspeaker LS, cannot enter voltage ranges threatened by breakdown as a result of parasitic currents.

The transitional phase is followed by a second phase, in which the transistor T2 is made conducting by the switch control SC, thus causing the charge capacitor C2 to be discharged through the loudspeaker. The result at the loudspeaker LS is a negative current pulse, with the voltage being defined when the capacitor C2 was charged. The volume appearing at the loudspeaker is thus already intrinsically dictated by the voltage limitation upon charging of the capacitor C2. Regardless of the calling alternating voltage U, the switch control SC keeps the transistor T2 conductive until a predetermined voltage value is reached. In this way, the capacitor C2 can discharge regardless of the predetermined time. In the switch control SC, for instance, this is achieved by firing a current-dependent self-holding circuit, for instance a construction with thyristor function, so that it keeps the transistor T2 conductive until the extinction voltage is reached. In this way, the capacitor C2 can discharge regardless of the predetermined time. The base current supplied to the transistor T2 is added to the charging current of the capacitor C2. The base current that is supplied to this circuit then flows away with reversed polarity through the clamp circuit CC. The clamp circuit CC is likewise controlled by the switch control SC, and preferably the clamp circuit CC is activated whenever the transistor T2 is made conducting. The transistors T1, T3 and T5 are blocked in this phase.

In the ringer mode, the outputs of the bridge end stage BD are switched off or are switched into a so-called tri-state state, and are constructed in such a way that in terms of voltage they are in an allowable breakdown-free stage. Conversely, in the speech mode the transistors T1–T5 and the switch circuit SC and the voltage regulator VR are all turned off or are in the tristate state, and the bridge end stage BD is activated. The control information necessary to distinguish between the two operating modes is derived from the cradle switch state (whether the receiver is placed on the cradle or has been picked up). However, in order to generate an internal call in the speech mode, the ringer circuit according to the invention can be activated and the bridge end stage BD turned off independently of the cradle switch state. The voltage supply is then made from an external voltage source, such as an external blocking oscillator converter UE that is connected to the capacitor C1. In this mode, the power-on logic EL and the voltage regulator VR remain out of operation, and the switching threshold for the transistor T5 is activated regardless of the voltage across the capacitor C1 during the first phase.

In a second mode, the ringer circuit according to the invention is operated with the piezoelectric crystal transducer CS, and the capacitor C2 is dispensed with. This mode is signaled to the switch control SC through the mode select switch MOD. In this mode, the transistors T1–T5 are switched off in the transitional phase. In the first phase, as in the first mode, the transistors T1 and T3 are made conducting by the digital control. This causes a current to flow through the transistor T1, the piezoelectric crystal transducer CS, the transistor T3, and the diode D to the capacitor C1. The voltage across the capacitor C1 rises as a result, given capacitive voltage division between the capacitors of the piezoelectric crystal transducer CS and of the capacitor C1. After a further transitional phase, in which the transistors T1–T5 are again blocked, a second phase follows, which proceeds differently from the second phase in the first mode. In this phase, a reversal of the polarity of the voltage at the piezoelectric crystal transducer CS (bridge mode) is effected by turning on the transistors T2 and T4. The volume is adjusted by the switch control SC by limiting the triggering signal for the transistor T4, in the same way as was done for the transistor T1 in the first phase. In contrast to the first mode, the transistor T2 is moreover not made conducting until the virtually complete discharging of the capacitance of the piezoelectric crystal transducer CS (in other words, there is no thyristor function). During this phase, the transistor T1 remains blocked.

Otherwise, the charging function of the capacitance of the piezoelectric acoustic transducer CS proceeds according to the same principle as in the first mode for the capacitance of the capacitor C2. However, in the second mode charging takes place twice during one period, in other words during the first and second phases, in all. This is advantageous because the piezoelectric acoustic transducer has a lower capacitance.

Besides low expenditure for circuitry, the ringer circuit according to the invention is distinguished by high flexibility and very high efficiency, above all. It is moreover advantageous that the energy built up in the calling mode at the capacitors GC and C2 when the receiver is picked up, or in other words at the transition from the call to the speech state, is still partially available, so that the run up time of the speech system is shortened substantially. The flexibility can be increased even further if the switch control SC is constructed entirely or partially as a microprocessor or microcontroller that can perform still other tasks as well.

Finally, it should be noted that for the sake of easier comprehension, no attempt was made to show the typical and, particularly in telephone technology, conventional, protective and adaptive provisions.

We claim:

1. A ringer circuit, comprising:
    a rectifier unit having a rectifier and a first capacitor; said rectifier receiving a calling alternating voltage and having first and second output terminals;
    said first capacitor being connected between the first and second output terminals of said rectifier;
    an acoustic transducer having first and second terminals;
    a controllable first switch connected between the first output terminal of said rectifier and the first terminal of said acoustic transducer;
    a controllable second switch connected between the first and second terminals of said acoustic transducer;
    a second capacitor connected between the second terminal of said acoustic transducer and the second terminal of said rectifier unit; and
    a switch control being supplied from said second capacitor for opening and closing said first and second switches in alternation and in phase opposition to one another as a function of the calling alternating voltage.

2. The ringer circuit according to claim 1, wherein said acoustic transducer is a dynamic acoustic transducer, and including a further capacitor connected with said dynamic acoustic transducer.

3. The ringer circuit according to claim 2, including a potential-free end stage being controllable by a speech alternating voltage and being connected to said dynamic acoustic transducer, said end stage being put out of operation upon the appearance of the calling alternating voltage.

4. The ringer circuit according to claim 2, wherein said first switch is kept closed and said second switch is kept opened until said further capacitor is discharged.

5. The ringer circuit according to claim 1, including a voltage regulator being supplied by said rectifier unit and having an output side connected parallel to said capacitor.

6. The ringer circuit according to claim 1, including a clamp circuit for limiting the voltage across said first switch if said switches are open.

7. The ringer circuit according to claim 1, wherein said second switch is operated as an emitter follower circuit and has a base at which a voltage is applied being higher than at said capacitor by a predetermined value.

8. The ringer circuit according to claim 1, including a power-on logic not activating said rectifier unit until a predetermined value of the calling alternating voltage U is exceeded.

9. The ringer circuit according to claim 1, including:
    third and fourth switches being mutually connected in series, said third and fourth switches being connected to said switch control and being controlled by said switch control in phase opposition to one another and to said first and second switches, respectively;
    said first and second switches being mutually connected in series, and said first and second switches being connected parallel to a series circuit defined by said third and fourth switches;
    said acoustic transducer being connected between a node connecting said first and second switches and a node connecting said third and fourth switches.

10. The ringer circuit according to claim 9, wherein said switch control receives a selection signal for keeping said third switch closed and said fourth switch open.

11. The ringer circuit according to claim 9, including:
    a diode connected before said capacitor as seen in a conducting direction; and
    a controllable fifth switch connected in parallel with said diode and said capacitor, said fifth switch being closed by said switch control if a predetermined voltage at said capacitor is exceeded.

12. The ringer circuit according to claim 9, wherein said second and fourth switches are each operated as an emitter follower circuit and have a base at which a voltage is applied being higher than at said capacitor by a predetermined value.

* * * * *